United States Patent [19]
DiStefano

[11] 4,079,368
[45] Mar. 14, 1978

[54] INFORMATION DISPLAY THROUGH DEFORMATION OF LIQUID DIELECTRIC MEDIA

[75] Inventor: Thomas Herman DiStefano, Tarrytown, N.Y.

[73] Assignee: International Business Machines Corporation, Armonk, N.Y.

[21] Appl. No.: 687,052

[22] Filed: May 17, 1976

[51] Int. Cl.² .................. G08B 5/36; G11C 11/42
[52] U.S. Cl. .................. 340/324 M; 350/359; 365/127; 365/153
[58] Field of Search .......... 340/173 LM, 173 CH, 340/324 R, 324 M, 378 R, 173 TP; 350/161 R, 267

[56] References Cited

U.S. PATENT DOCUMENTS

| 3,249,724 | 5/1966 | Hurvitz | 340/173 CH |
| 3,648,269 | 3/1972 | Rosenweig et al. | 340/324 R |
| 3,668,106 | 6/1972 | Ota | 340/173 CH |

Primary Examiner—Stuart N. Hecker
Attorney, Agent, or Firm—Bernard N. Wiener

[57] ABSTRACT

The practice of this invention provides display of information which utilizes the inherent characteristic of the displacement by an applied electric field intensity distribution of the interface between two fluid dielectric media which are operationally immiscible in each other and have different total dielectric properties at the interface. In particular, the information handling and display in the practice of this invention are with an optical display device in which the two dielectric media are immiscible liquids, e.g., oil and water. The local displacement of the interface therebetween is accomplished by the local application of an electric field which effects movement of the interface by electrohydrodynamic interaction with the dielectric media at the interface. An embodiment of the invention includes an electrode structure for applying an electric field intensity distribution so that the interface can be displaced locally and selectively and preferentially in accordance with a particular information pattern.

14 Claims, 12 Drawing Figures

THEORETICAL

ACTUAL

INFORMATION DISPLAY THROUGH DEFORMATION OF LIQUID DIELECTRIC MEDIA

BACKGROUND OF THE INVENTION

It is known in the prior art that the interface between two immiscible liquids can be distorted by an applied electric field with components perpendicular to the interface. An electric field exerts an effective pressure on the interface if the two liquids have different incremental dielectric permittivities or if they have different incremental conductivities. The applied electric field induces an electric charge distribution on the interface between the two liquids which is subjected to a force distribution by the electric field.

Heretofore, the phenomenon of distortion of the interface between two immiscible dielectric media has been considered to be detrimental to the operation of a device in which they are present. Illustratively, contiguous oil and water layers are utilized in practice of electrophotography, as described in the following identified literature reference of background interest: IBM Journal of Research and Development, Vol. 19, Number 6, Pg. 514–522, Nov. 1975, by Y. O. Tu entitled "Theory of Liquid Ink Development in Electrophotography".

Other literature of background interest include the following identified items: S. Chandrasekhar, "Hydrodynamic and Hydromagnetic Stability", Oxford University Press, Lond, 1961; L. D. Landau and E. M. Lifshitz, "Electrodynamics of Continuous Media", Pergamon Press, Elmsford, New York, 1960; L. C. Laudau and E. M. Lifshitz, "Fluid Mechanics", Pergamon Press, Elmsford, New York, 1959; J. R. Melcher "Field-Coupled Surface Waves", MIT Press, Cambridge, Mass, 1963; and D. H. Michael, "Free Surface Instability in Electrohydrodynamics", Proc. Camb. Phil. Soc. 64, 527 (1968).

OBJECTS OF THE INVENTION

It is an object of this invention to provide an information handling system which has an electrode structure as an integral part thereof, with a viscous liquid region between respective pairs of electrodes for applying an electric field therebetween, in which the viscous region comprises two immiscible liquid volumes which have different total dielectric properties.

It is another object of this invention to provide an optical display device which includes: a liquid viscous region that is divided into two parts which have different total dielectric properties, means for establishing an electric field through the interface between the two parts of the viscous region for deforming it, and electric field means for maintaining a resultant physical deformation in the viscous region.

It is another object of this invention to provided an information storage device including a plurality of viscous media having a respective zonal boundary between respective pairs thereof, and an electric field applying means for introducing selectively and preferentially local pressures on said zonal boundaries in accordance with a selected distribution of information states.

It is another object of the invention to provide a method for information handling in which an applied electric field causes displacement of a zone of a viscous region having a differential total dielectric property along a particular direction therein.

It is another object of this invention to provide an optical display device in which physical displacements of portions of an interface between two different viscous liquid dielectric media at localized regions thereof are effected by an applied electric field to denote information states that are discernible by changes in the local transmission or reflection characteristics of the media.

It is another object of this invention to utilize a plurality of viscous liquid regions having different total dielectric properties on respective sides of respective interfaces to record the characteristic pattern of local intensities of an applied electric field with components perpendicular to said interfaces.

It is another object of this invention to provide an optical display device wherein distinguishable movements of interfacial boundaries in viscous dielectric media manifest a pattern of information as a representation of a distribution of intensities of an applied electric field.

SUMMARY OF THE INVENTION

The practice of this invention provides display of information which utilizes the inherent characteristic of the displacement of the interface between two immiscible liquid dielectric media having different total dielectric properties at the interface by an applied electric field intensity distribution. The total dielectric property incremental dielectric permittivity $\epsilon$, and conductivity $\sigma$ should preferably be different for each of the media.

The information handling in the practice of this invention is with an optical display in which the two dielectric media are immiscible fluids, e.g., oil and water. The local displacement of the interface therebetween is accomplished by the local application of an electric field which effects movement of the interface by electrohydrodynamic interaction with the dielectric media at the interface. An embodiment of the invention includes an electrode structure for applying an electric field intensity distribution so that the interface can be displaced locally and selectively and preferentially in accordance with a particular information pattern.

An electric field exerts a pressure on the interface between two immiscible liquids either when the two adjacent liquids have different total dielectric properties or when one of the liquids is more electrically conducting than the other. The electric field induces an electric charge on the interface which is then subjected to a force due to the electric field. The electric field induced distortion, e.g., in the form of a dimple, is used to scatter light, to gate light, or to hinder total internal reflection. Illustratively, an array of points or cells of light gates is utilized for the practice of this invention to form a two dimensional matrix addressed array optical display. The cell at a given location is turned on by applying a threshold potential between the respective electrode and the counter-electrode.

Because of the different incremental conductivity $\sigma$ and different incremental dielectric permittivity $\epsilon$ of the two liquid dielectrics, the applied electric field exerts a directed pressure on the interface which is perpendicular thereto. This pressure moves the interface toward one of the electrodes, dependent upon the relative $\epsilon$'s and $\sigma$'s of the two layers. Incident light can then be made to pass or not pass selectively and preferentially through the distorted regions of the interface.

The optical display device of this invention has an inherent memory feature due to a hysteresis in displacement of the interface between the two dielectric media.

Hysteresis or memory results from an increase in the electric field in one of the liquid media caused by a distortion of the liquid-liquid interface, leading to a further increase in that distortion. A small ac voltage, or dc voltage when left on the selected pair of electrodes after deformation of the interface produced during matrix point selection, is sufficient to maintain the deformed "ON" state.

BRIEF DESCRIPTION OF THE FIGURES

FIGS. 1A–1D present schematic drawings of an exemplary embodiment of this invention illustrating the principles of this invention as applied for a matrix addressable electrode array structure with two layered immiscible viscous dielectric media having different total dielectric properties in which:

FIG. 1A presents a cross-sectional view especially delineating the zonal boundary or interface between two layered liquid dielectric media and the change thereof obtained by particular selection of one pair of electrodes of a matrix array of electrodes;

FIG. 1B presents a portion of the exemplary embodiment to delineate a selected pair of electrodes and the ac voltage and dc voltage sources for activating them;

FIG. 1C presents a characterization of the exemplary embodiment especially delineating the addressable matrix electrode array structure; and FIG. 1D presents an enlarged view of a portion of FIG. 1C as a basis for a descriptive characterization of illustrative materials for the exemplary embodiment.

FIGS. 2A–2D present drawings of an apparatus for obtaining exemplary experimental results for illustrating the principles of this invention in which:

FIG. 2A presents a cross-sectional view of the apparatus used for the experimental purpose and which especially delineates the geometrical relationships among the two immiscible liquid dielectric media and the electrode structure;

FIG. 2B shows the quiescent state of the interface boundary between the two dielectric media for an applied voltage of 0 volts;

FIG. 2C shows that an applied voltage of 100 volts causes a slight bending of the entire interface; and FIG. 2D shows that a voltage of 200 volts causes a dynamic and positive feedback process to occur which effectively draws the interface between the water and the toluene all the way to the electrode adjacent to the toluene, so that the water extends substantially from one electrode to the other.

FIGS. 3A–3D are line drawings which illustrate theoretical premises for the practice of this invention in which:

FIG. 3A shows an initial distortion of the interface region between a pair of electrodes with nomenclature useful for a theoretical exposition considering the parabolic displacement of the interface for small applied electric field;

FIG. 3B shows how the interface between two electrodes changes shape as the magnitude of the applied voltage is increased.

FIG. 3C shows the calculated displacement of the interface of the applied voltage for small displacements;

FIG. 3D shows an estimate of the actual displacement of the interface.

PRINCIPLES OF THE INVENTION

Figure 1A:
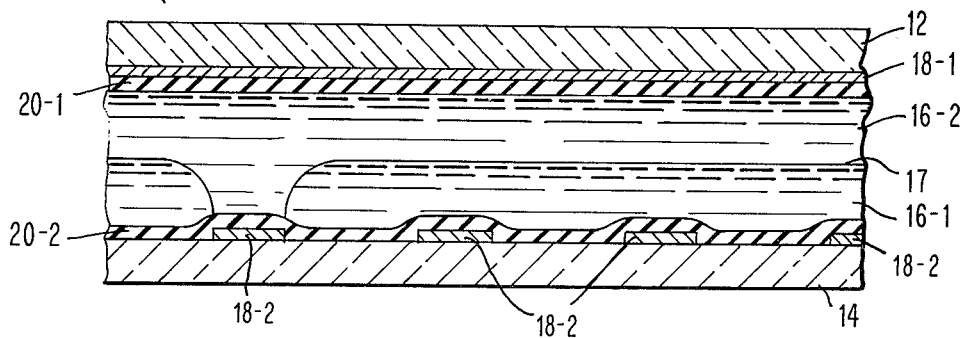

According to the principles of this invention, for an optical information handling system, two liquid or viscous immiscible regions are present having a zonal boundary or interface therebetween with different total dielectric properties of the materials adjacent to either side thereof; and an electric field is applied with a component perpendicular to the interface in order to effect a distortion thereof. An ac or dc holding voltage may be utilized in order to maintain selected distortion. The interface need not be fully moved to an adjacent electrode cross-over point in order that there be some external manifestation of the imparted information state. The external manifestation of the information is presented by the movement of the zonal boundaries between the liquid media.

FIGS. 1A, 1B, 1C and 1D are schematic representations of aspects of an exemplary embodiment of this invention illustrating the principles thereof as applied for the fabrication of an optical information display. It utilizes two dielectric media having different total dielectric properties, and an electrode-structure by which an electric field is applied to local selected volumes of the dielectric region between the corresponding selected pairs of electrodes.

The exemplary embodiment 10 comprises electrode support plates 12 and 14, e.g., fabricated of transparent glass. The volume between the support plates 12 and 14 is filled with two liquid dielectric media 16-1 and 16-2 which are immiscible in each other and which have different total dielectric properties on either side of the interface 17 therebetween. Illustratively, liquid 16-1 which was originally adjacent to support plate 14 is toluene and liquid 16-2 which was originally adjacent to support plate 12 is water. Electrode 18-1 is shown mounted on support plate 12 and cross on electrodes 18-2 are shown mounted on suport plate 14. Coverings 20-1 and 20-2 are thin films on the electrodes 18-1 and 18-2, respectively, which contact the toluene 16-1 and the water 16-2.

For optimal operational results, the contacting surface 20-1 of the support plate 12 and the electrode-structure 18-1 which is established on the interior surface thereof is treated to have a hydrophillic surface and the interior surface 20-2 of the support plate 14 and the electrode-structure 18-2 thereat is treated to have a hydrophobic surface. The art of producing hydrophillic and hydrophobic surfaces is well known in the prior art, e.g., in the offset printing trade.

Figure 1B:
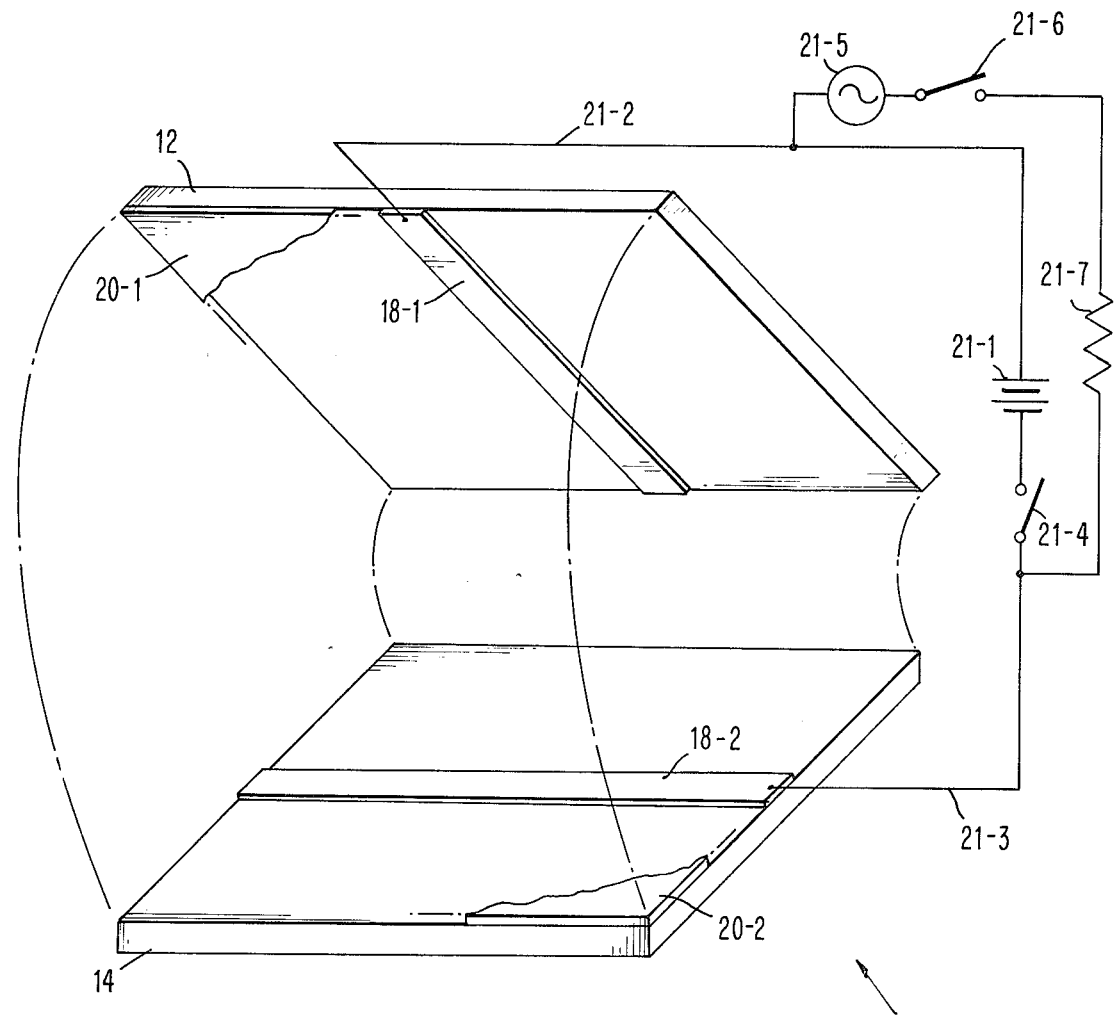

The opened view of FIG. 1B shows two exemplary cross-over electrodes 18-1 and 18-2 in relationship of the structure of FIG. 1A. An electric field is established between the named electrodes by application of a dc voltage source 21-1 via conductor 21-2 connected to electrode 18-1 and via conductor 21-3 connected to electrode 18-2. The said electric field is established between the electrodes by the closing of switch 21-4. An alternating component of electric field is applied between the respective cross-over pair of electrodes from ac voltage source 21-5 via switch 21-6 and resistor 21-7 which establishes said ac voltage component in parallel with the dc voltage source 21-1. Resistor 21-7 prevents burn-out or other deleterious effects upon dc voltage source 21-1 and ac voltage source 21-5 when both switches 21-4 and 21-6 are closed simultaneously. When the deformation of the liquid-liquid interface has been caused to move to the vicinity of one of the electrodes of the particular cross-over pair of electrodes involved, the dc switch 21-4 may be opened and the deformation then retained by the applied holding ac voltage.

Figure 1C:
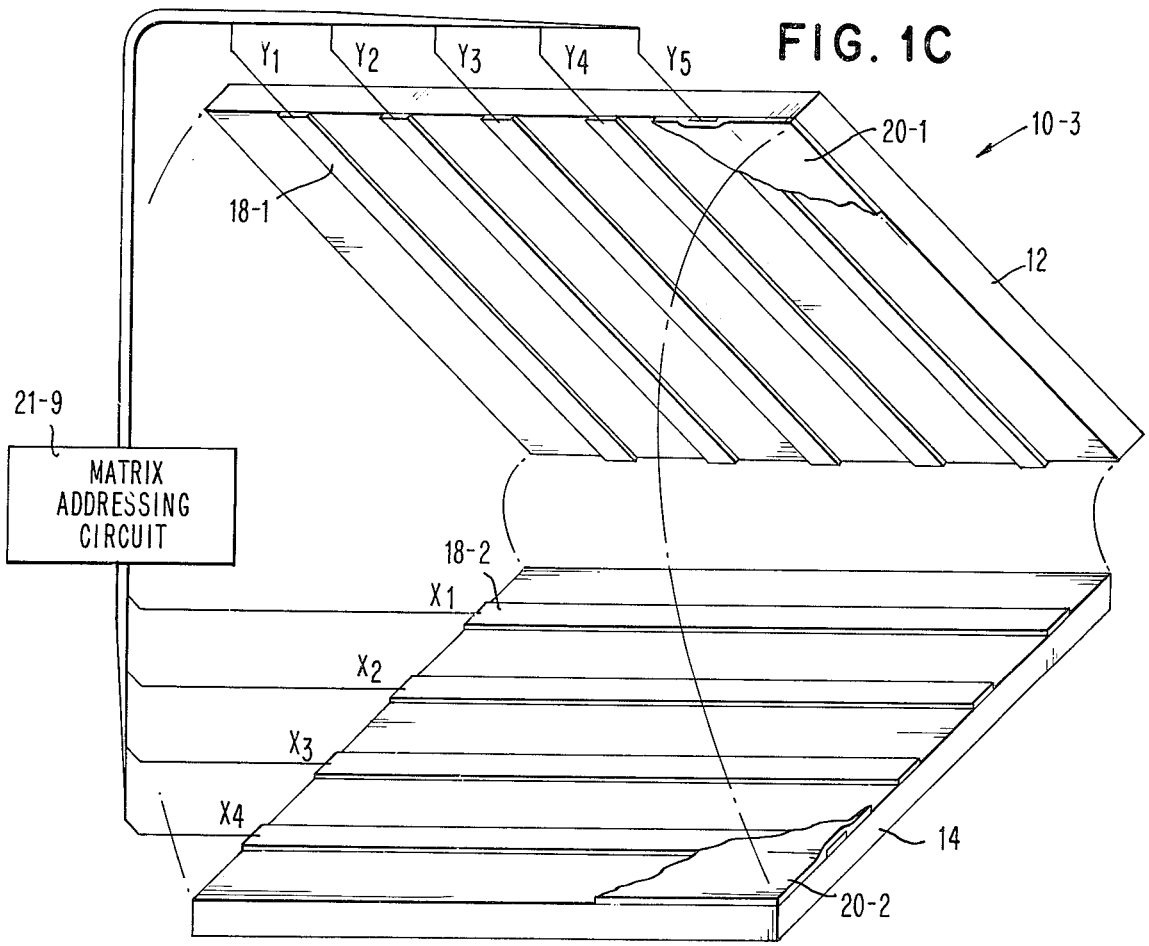
Figure 1D:
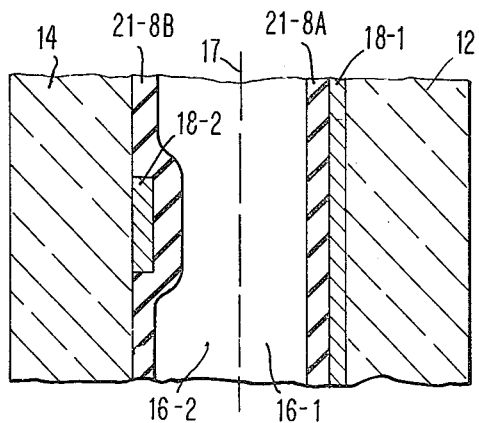

A two dimensional matrix array of addressable electrodes for the practice of this invention is presented by FIG. 1C. A portion thereof is shown in FIG. 1D to characterize certain details of the electrode structure. The X electrodes X1, X2, X3, X4 are established on support plate 14 and Y electrodes Y1, Y2, Y3, Y4, Y5 are established on support plate 12. Illustratively the electrodes may comprise transparent conductive tin oxide stripes. The hydrophobic coating for the X electrodes is conveniently a CuO thin film 21-8B formed by deposition and the hydrophillic coating for the Y electrodes is conveniently an $Al_2O_3$ thin film 21-8A, which may be been formed by anodization of a thin film of aluminum.

As illustrated in the schematic diagram of FIG. 1C, by applying an operational voltage to a pair of electrodes through a matrix addressing circuit 21-9, an appropriate potential is obtained in the spacial volume characterized at the intersection between the two electrodes, e.g., the cross-over point for X3 electrode and Y3 electrode.

In the quiescent state of operation of the embodiment 10 of FIG. 1, zonal boundary 17 between dielectric media 16-1 and 16-2 is essentially parallel to the glass support plates 12 and 14. When a selected pair of electrodes is activated, a directional force is applied to the interface in the area of the zonal boundary defined by the electric field pattern between the selected pair of electrodes which "pushes" or "pulls" that partial zonal boundary toward one of the electrodes of the selected pair of electrodes.

When the interface 17 has been pulled to a selected electrode by an electric field, the distorted interface manifests a modified light transmission or reflection characteristic, either because the light suffers changed internal reflection at the liquid-liquid interface or because the light is absorbed differently in one of the two layers of liquid.

The physical mechanism by which an applied electric field exerts a pressure on the interface results from the action of an electric field on two liquids with different total dielectric properties. The different total dielectric properties can be obtained either by the incremental dielectric permittivities $\epsilon_1$ and $\epsilon_2$ being the same and the incremental conductivities $\sigma_1$ and $\sigma_2$ being different and vice versa. Especially advantageous practice of this invention is obtained when both $\epsilon_1$ and $\epsilon_2$, and $\sigma_1$ and $\sigma_2$ are different in each of the two dielectric media.

Further, since the liquid of dielectric medium 16-1 may be moved by sequential control of the cross-over points, the configuration of FIG. 1C may be utilized for manifesting a sequence of information states.

Illustratively, in the case in which liquid 16-1 is toluene and liquid 16-2 is water, the electrical conductivity of the water is several orders of magnitude greater than the conductivity of the toluene. As a result, a dc voltage applied across the two liquid layers at the intersection of two liquid layers at the intersection of two electrodes, i.e. X3 and Y3, acts as if there is a relatively high electric field in the toluene and a relatively low electric field in the water after a short initial transient. The initial transient response has little influence on the liquid-liquid interface 17 because the dielectric relaxation time of the water is much shorter than the response time of the displacement of the interface. The resulting high electric field in the toluene exerts a force on the interface 17, drawing it to the electrode X3 and decreasing the thickness of the toluene layer. As the toluene layer 16-1 is decreased in thickness in the local region between electrodes X3 and Y3, the electric field therein is correspondingly increased since the applied voltage appears substantially across the toluene layer.

Accordingly, the increased electric field leads to a larger force on the interface 17 and a corresponding additional decrease in thickness of the toluene. At a sufficiently high applied voltage $V_T$, a threshold is reached and the deformation becomes unstable, leading to a collapse of the toluene layer in the region between the electrodes, illustratively X3 and Y3, toward electrode X3. After the collapse, only a small voltage, either ac or dc, when applied between the electrodes X3 and Y3 is sufficient to maintain the deformed interface at the electrode X3, and to maintain the thickness of the toluene layer therebetween in its collapsed condition.

In effect, the system exhibits a hysteresis or memory such that a display position, illustratively X3 and Y3, which has been selected by momentarily impressing a voltage between electrodes X3 and Y3, can be maintained by a small additional voltage applied between the electrodes X3 and Y3. This small auxiliary voltage should be insufficient to cause any display position to be selected. Thus, the small auxiliary voltage may be maintained between all of the electrodes in the X-array and all of the electrodes in the Y-array without causing any of the display points to be selected.

However, the small auxiliary voltage is established to be sufficiently large, e.g., about one-tenth of the threshold voltage, so that any point that is selected for display will be maintained even after the selecting voltage is removed. Since the operation of the device is substantially independent of the sign of the applied voltage, either ac voltage or dc voltage can be used as the small auxiliary voltage. The ac voltage is advantageous in that it minimizes the deleterious effects due to polarization bubbles which may form on the electrodes when a dc auxiliary voltage is applied for a long period of time.

The exemplary embodiment 10 operates as an optical display when the deflections of the interface 17 are used to gate or modulate light which is incident on the device. The incident light is gated by the device by a change in reflectance caused by a deflection of the interface 17 or by absorption in one of the viscous dielectric layers 16-1 or 16-2.

Illustratively, the exemplary embodiment 10 employs absorption in viscous liquid layer 16-1 which is due to an oil soluble dye in the toluene. A light output is effected at a desired point by activating by a dc voltage pulse the pair of electrodes corresponding to that point. The activation pulls the interface 17 to the electrode on support plate 14 (next to the toluene), where it is held by a small ac voltage with peak value which is from about one half to about one-tenth the peak of the dc voltage activating pulse. As a result, the thickness of the toluene layer at that point is greatly reduced, and light is able to pass through the display at the selected point.

EXPERIMENTS FOR THE INVENTION

An experimental procedure for the practice of this invention will be explained through reference to FIGS. 2A, 2B, 2C and 2D. The stable electrohydrodynamic modes of deformation of adjacent viscous dielectric media will be demonstrated for the exemplary liquids toluene and water shown in FIG. 2A which is a schematic diagram of an exemplary laboratory apparatus.

A beaker 22 with lid portion 22-1 has tube 24 introduced therethrough for purpose of establishing a volume of liquid toluene "T" in the beaker 22. An additional tube 26 is established through the lid portion 22 for the purpose of introducing a volume of liquid water "W" to the lower-most portion of the beaker 22 so that the interface 28 between toluene 23-1 and water 23-2 is encompassed between the electrode structure comprised of a pair of electrodes 30 and 31, separated by about 1.5 millimeters. The water in the lower portion of the beaker 22 was established at height of approximately 0.7 millimeters above the lower electrode structure 31. The dielectric characteristics of toluene and water are such that a potential applied across an electrode-structure per FIG. 2A causes the interface 28 to move toward the upper electrode structure 30.

Figure 2A:
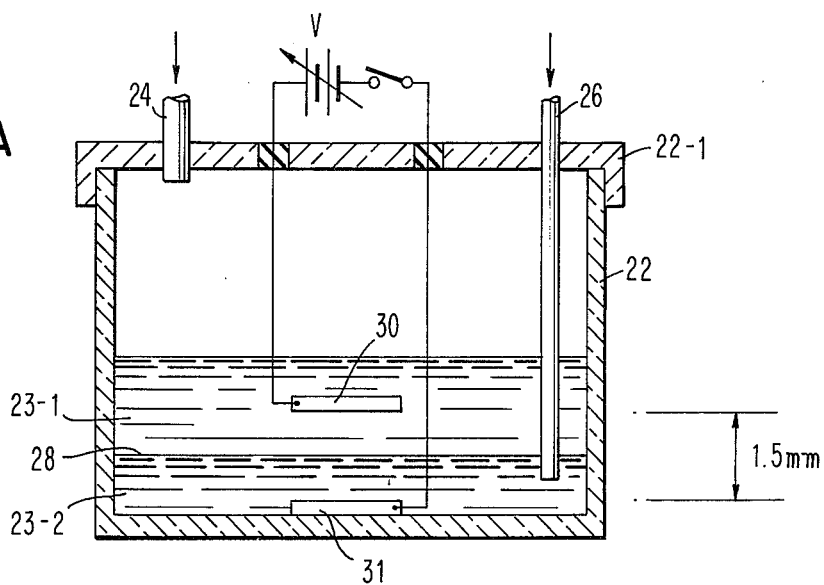
Figure 2B:
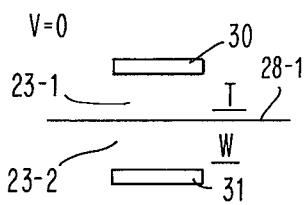
Figure 2C:
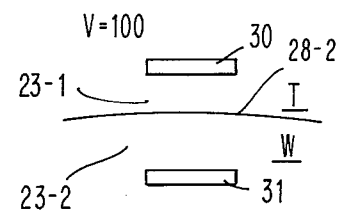
Figure 2D:
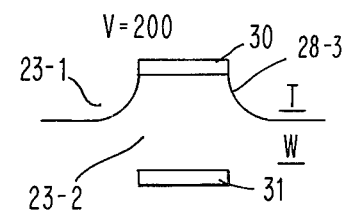

The quiescent condition is shown in FIG. 2B for zero applied volts so that the planar boundary 28 is parallel to the lower portion of the beaker. For an intermediate applied voltage of 100 volts, the interface boundary has not moved significantly to position 28-2. However, there is a sharp threshold in the voltage so that for an applied voltage of 200 volts the interface 28-3 is moved to a position proximate to the electrode structure 30 toward the upper boundary of the toluene. Once the threshold voltage has been exceeded and the interface 28-3 has extended to the top electrode, it could be held there with an auxiliary ac or dc voltage of about 20 volts.

THEORY FOR THE INVENTION

An approximate theory for the operation of this invention will be presented with especial reference to FIGS. 3A, 3B, 3C and 3D and to the drawing of FIG. 1A.

Figure 3A:
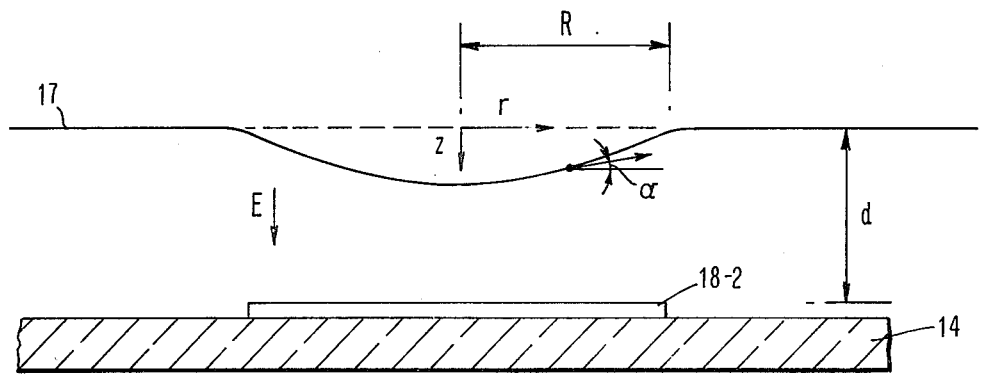

For convenience of exposition, the line drawing of FIG. 3A is considered in the context of FIG. 1A. Illustratively, one of the layers 16-2 has an incremental conductivity $\sigma_1$ which is many orders of magnitude greater than the incremental conductivity $\sigma_2$ of the other layer 16-1. The respective dielectric constants have real components $\epsilon_1$ and $\epsilon_2$, respectively. In static equilibrium, with no voltage applied between the electrodes, the interface 17 between the immiscible liquids is a planar surface which lies a distance $d$ above the electrode 18-2 on the low conductivity side. For simplicity of calculation, each of the electrodes 18-1 and 18-2 is assumed to be circular with a radius R.

Figure 3C:
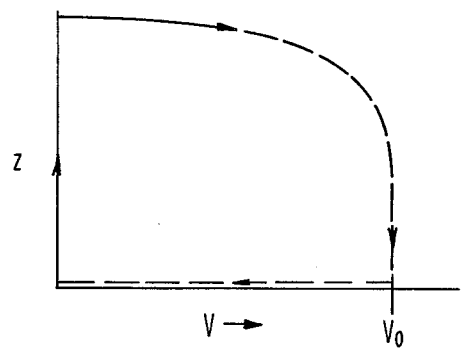
Figure 3D:
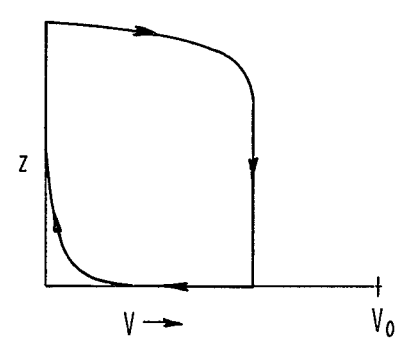
Figure 3B:
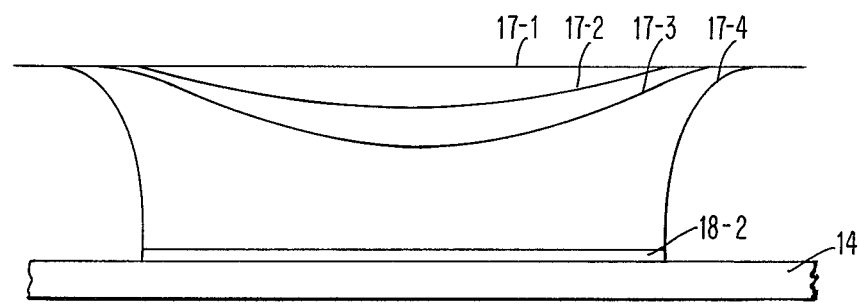

As different and successively larger voltages are applied to a set of opposing electrodes 18-1 and 18-2, the interface 17 will distort as is depicted by the series 17-1, 17-2, 17-3, and 17-4 in FIG. 3B. An electric field of approximately $E=V/d$ is impressed across the low conductivity liquid 16-1 for the case of small distortion $z=Kr^2$ of the interface, where K is a constant dependent on the physical parameters of the optical display and $r$ is the distance from the center of the circular electrode where the particular deformation $z$ is monitored. The electric field E exerts a force which acts against surface tension F in the interface to produce a parabolic distortion of the interface given by expression (1)

$$2\pi rF \sin\alpha = \int_o^r \frac{(2\pi r dr)\epsilon V^2}{(d-z)^2}, \quad (1)$$

where $r$ is radius, $\alpha$ is the angle of the interface, $\epsilon$ is the dielectric constant of the low conductivity liquid, V is the applied voltage, and $z$ is the distortion of the interface. Integrating the equation gives expression (2)

$$\frac{2KFR^2}{\epsilon V^2} = \frac{1}{2K(d-KR^2)} \int_o^{\left(\frac{KR^2}{d-KR^2}\right)} \left[\frac{KR^2}{(d-KR^2)} \cdot \frac{d\left(\frac{Kr^2}{(d-Kr^2)}\right)}{\left\{1+\frac{Kr^2}{d-KR^2}\right\}^2}\right], \quad (2)$$

which yields the result given by expression (3)

$$\frac{2KFR^2}{\epsilon V^2} = \frac{1}{2K(d-KR^2)} \left(1 - \frac{1}{1+\frac{KR^2}{d-KR^2}}\right). \quad (3)$$

Solving for K, the coefficient of the parabolic distortion, from the equation $$(1-\frac{KR^2}{d})^2(\frac{FR^2}{d}) = \frac{\epsilon V^2 R^2}{4F} \quad (4)$$

yields the approximate solution given by expression (5)

$$\frac{KR^2}{d} \cong \frac{1}{2} \pm \frac{1}{2}\sqrt{1-\frac{(\epsilon V^2 R^2)}{F}} \quad (5)$$

The displacement $z$ is then found as a function of voltage and the physical parameters of the system as given by expression (6)

$$z \cong \frac{d}{2} \pm \frac{d}{2}\sqrt{1-\frac{\epsilon V^2 R^2}{Fd^3}}. \quad (6)$$

The approximate solution for the displacement $z$ is shown in FIG. 3C.

At the critical voltage of $V_o = (Fd^3/\epsilon R^2)$, the interface is pulled completely into the electrode. In order to release the interface and return the cell to its initial condition, it is necessary to reduce the applied voltage to a small percentage, typically less than 10%, of the critical voltage. Thus, the system has hysteresis, or memory.

The actual distortion of the interface in response to an applied voltage is not exactly parabolic for large distortions from the theoretical. As a result, the display device cell switches at a lower voltage than that calculated on the basis of a simple parabolic distortion. The result is a response curve such as is shown in FIG. 3D.

CONSIDERATIONS FOR THE INVENTION

Another exemplary embodiment of this invention is beneficially achieved with two especial liquids. One especial liquid is water $H_2O$. The other especial liquid which is immiscible in $H_2O$ is trichloro-methane $CHCl_3$ ($\epsilon = 5.70 \epsilon_0$, surface tension with $H_2O$ = 33 dynes/cm, and density = 1.1064). a suitable dye for $CHCl_3$ is phenyl-chloride $C_6H_5Cl$ which colors it red, and is insoluble in distilled $H_2O$. The threshold voltage $V_T$ for the liquid pair of water-trichloromethane is found for the following exemplary parameters of $d=10,000$ Angstroms and $R=0.5$mm to be $V_T=2.7$ volts; and for $d=30,000$ Angstroms and $R=1.0$mm, $V_T=18.2$ volts. For desirable dimensions and physical parameters the thickness of the quiescent hydrophobic liquid layer can range from about 1,000 Angstroms to 100,000 Angstroms.

A reference book which presents other exemplary liquids suitable for the practice of this invention in accordance with the principles thereof is: *Handbook of Chemistry and Physics,* 48 Edition, Published by the Chemical Rubber Co., Cleveland, Ohio, 1967. Data for the specific chemicals of this exemplary embodiment are listed therein: trichloromethane on p. C-407 (m306), phenyl-chloride on p. C-154 (b407).

With reference to FIG. 1D, the layer 21-8B of copper oxide may desirably have thickness in the range of 10 to 1000 Angstroms; and the layer 21-8A of aluminum oxide may desirably have thickness of 10 to 1000 Angstroms.

I claim:

1. An optical display device comprising:
   a liquid dielectric region which is divided into two adjacent immiscible media with different total dielectric properties;
   electrode structure means for establishing an electric field intensity pattern representative of information across the interface between the two immiscible media; and
   voltage means connected to said electrode structure means for both inducing and stably maintaining a reversible physical deformation of the interface between the two media of said liquid region as manifestation of said information to be displayed, said voltage being above a threshold value for inducing hysteresis in said deformation.

2. Display device as set forth in claim 1 wherein said electrodes are thin conductive films respectively on two opposite substantially parallel support surfaces.

3. Display device as set forth in claim 2 wherein said electrodes on one surface are oblique to the said electrodes on the opposite surface.

4. Display device as set forth in claim 3 wherein said interface between said two immiscible media is quiescently parallel to the two said opposite support surfaces for surfaces said electrodes.

5. Display device as set forth in claim 4 wherein the two immiscible media of said liquid region comprise a hydrophobic liquid and a hydrophyllic liquid.

6. An information storage device comprising:
   a liquid region including a plurality of immiscible liquid media having a respective zonal boundary therebetween;
   an electric voltage applying means for establishing an electric field pattern representative of an information pattern in said liquid region with components perpendicular to said zonal boundaries said components of said electric field having intensities above a threshold value for inducing hysteresis in physical deformations of said zonal boundary;
   electronically activated means for maintaining said physical deformations in said liquid media, to represent an information pattern; and
   optical means for determining said deformations of said zonal boundaries as indicia of said stored information pattern.

7. Method for information handling and display by using the influence of an electric field pattern on a liquid dielectric material having at least two immiscible liquid media of different total dielectric properties adjacent at a respective interface comprising the steps of:
   establishing a liquid region of selected immiscible liquid materials in a particular physical condition in which the several liquid materials are arranged in a stable configuration;
   applying an electric voltage pattern representative of stored information to said liquid region such that an electric field is formed with components perpendicular to said interface between said adjacent liquid materials, said components of said electric field having intensities above a threshold value for inducing hysteresis in physical deformation of said zonal boundary;
   maintaining physical deformation of said interface by applying a small ac or dc electric field across said surface; and
   detecting by optical means the deformation of the interface as a manifestation of the stored information.

8. An optical display device comprising:
   a liquid dielectric region which is divided into two adjacent immiscible media with different total dielectric properties,
      said two immiscible media of said liquid region comprise a hydrophobic liquid and a hydrophillic liquid;
   electrode structure means for establishing an electric field intensity pattern representative of information across the interface between said two immiscible media;
      said electrodes comprise thin conductive films respectively on two opposite substantially parallel support surfaces,
      said electrodes on one surface being oblique to the said electrodes on the opposite surface,
      said interface between said two immiscible media being quiescently parallel to the two said opposite support surfaces for said electrodes,
      said opposite parallel surface and said electrodes being each coated with a thin film respectively,
         one surface and the electrodes thereon being coated with a hydrophillic film adjacent to said hydrophillic liquid, and
         the opposite surface and the associated electrodes thereon being coated with a hydrophobic film adjacent to said hydrophobic liquid; and
   voltage means connected to said electrode structure means for both inducing and stably maintaining a reversible physical deformation of the interface between the two media of said liquid region as manifestation of said information to be displayed, said voltage being above a threshold value for inducing hysteresis in said deformation.

9. Display device as set forth in claim 8 in which:
   said hydrophillic film is a layer of aluminum oxide of thickness in the approximate range of 10 Angstroms, to 1000 Angstroms, and
   said hydrophobic film is a layer of copper oxide of thickness in the approximate range of 10 Angstroms to 1000 Angstroms.

10. Display device as set forth in claim 8 in which said hydrophillic liquid is water and said hydrophobic liquid is toluene.

11. Display device as set forth in claim 8 in which said hydrophobic liquid is not substantially transparent to visible light.

12. Said display device as set forth in claim 11 in which said hydrophobic liquid is a mixture of two hydrophobic liquids, one of which strongly absorbs visible light.

13. Display device as set forth in claim 12 in which;
said hydrophobic liquid is a mixture of trichloromethane and phenylchloride; and
said hydrophillic liquid is distilled water.

14. Display device as set forth in claim 11 in which said hydrophobic liquid layer is in the approximate range of 1000 Angstroms to 100,000 Angstroms thick in the quiescent state.

* * * * *